(12) United States Patent
Gupta et al.

(10) Patent No.: US 10,113,465 B2
(45) Date of Patent: Oct. 30, 2018

(54) SYSTEMS AND METHODS TO REDUCE REDUCTANT CONSUMPTION IN EXHAUST AFTERTREATMENT SYSTEMS

(71) Applicant: Cummins Inc., Columbus, IN (US)

(72) Inventors: Aniket Gupta, Wuhan (CN); Michael J. Cunningham, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/389,625

(22) Filed: Dec. 23, 2016

(65) Prior Publication Data

US 2017/0114690 A1 Apr. 27, 2017

Related U.S. Application Data

(62) Division of application No. 14/461,952, filed on Aug. 18, 2014, now Pat. No. 9,567,888.

(Continued)

(51) Int. Cl.
| | |
|---|---|
| *F01N 3/20* | (2006.01) |
| *F01N 3/035* | (2006.01) |
| *F01N 3/02* | (2006.01) |
| *F01N 3/08* | (2006.01) |
| *F01N 13/00* | (2010.01) |
| *B01D 53/94* | (2006.01) |
| *B01D 46/00* | (2006.01) |

(52) U.S. Cl.
CPC ......... *F01N 3/208* (2013.01); *B01D 46/0027* (2013.01); *B01D 53/9418* (2013.01); *B01D 53/9431* (2013.01); *B01D 53/9486* (2013.01); *B01D 53/9495* (2013.01); *F01N 3/0205* (2013.01); *F01N 3/035* (2013.01); *F01N 3/0814* (2013.01); *F01N 3/0821* (2013.01); *F01N 3/0835* (2013.01); *F01N 3/0842* (2013.01); *F01N 13/009* (2014.06); *F01N 2610/02* (2013.01); *F01N 2610/146* (2013.01); *F01N 2900/0416* (2013.01); *F01N 2900/1602* (2013.01); *F01N 2900/1622* (2013.01)

(58) Field of Classification Search
CPC .......................... F01N 3/208; F01N 13/0093
See application file for complete search history.

(56) References Cited

U.S. PATENT DOCUMENTS

| 6,125,629 A | 10/2000 | Patchett |
|---|---|---|
| 6,182,443 B1 | 2/2001 | Jarvis et al. |

(Continued)

FOREIGN PATENT DOCUMENTS

| AT | 291685 T | 4/2005 |
|---|---|---|
| CN | 104145096 | 11/2014 |

(Continued)

*Primary Examiner* — Jonathan Matthias
(74) *Attorney, Agent, or Firm* — Taft Stettinius & Hollister LLP

(57) ABSTRACT

Systems, apparatus and methods are provided for reducing reductant consumption in an exhaust aftertreatment system that includes a first SCR device and a downstream second SCR device, a first reductant injector upstream of the first SCR device, and a second reductant injector between the first and second SCR devices. NOx conversion occurs with reductant injection by the first reductant injector to the first SCR device in a first temperature range and with reductant injection by the second reductant injector to the second SCR device when the temperature of the first SCR device is above a reductant oxidation conversion threshold.

18 Claims, 4 Drawing Sheets

Related U.S. Application Data

(60) Provisional application No. 61/971,262, filed on Mar. 27, 2014.

(56) References Cited

U.S. PATENT DOCUMENTS

| | | |
|---|---|---|
| 6,182,444 B1 | 2/2001 | Fulton et al. |
| 6,269,633 B1 | 8/2001 | van Nieuwstadt |
| 6,877,313 B1 | 4/2005 | Phillips et al. |
| 6,912,847 B2 | 7/2005 | Deeba |
| 6,996,975 B2 | 2/2006 | Radhamohan et al. |
| 7,062,904 B1 | 6/2006 | Hu et al. |
| 7,188,469 B2 | 3/2007 | Bonadies et al. |
| 7,229,597 B2 | 6/2007 | Patchett et al. |
| 7,264,785 B2 | 9/2007 | Blakeman et al. |
| 7,334,400 B2 | 2/2008 | Yan et al. |
| 7,377,101 B2 | 5/2008 | Mital et al. |
| 7,485,272 B2 | 2/2009 | Driscoll et al. |
| 7,614,220 B2 | 11/2009 | Breuer et al. |
| 7,674,743 B2 | 3/2010 | Gandhi et al. |
| 7,685,813 B2 | 3/2010 | McCarthy, Jr. |
| 7,805,929 B2 | 10/2010 | Driscoll |
| 7,902,107 B2 | 3/2011 | Patchett et al. |
| 7,998,423 B2 | 8/2011 | Boorse et al. |
| 8,037,674 B2 | 10/2011 | Kupe et al. |
| 8,158,067 B2 | 4/2012 | Choi |
| 8,551,432 B2 | 10/2013 | Adelman et al. |
| 8,997,461 B2 | 4/2015 | Henry et al. |
| 2005/0069476 A1 | 3/2005 | Blakeman et al. |
| 2005/0284134 A1 | 12/2005 | Radhamohan et al. |
| 2006/0260296 A1 | 11/2006 | Theis |
| 2007/0012032 A1 | 1/2007 | Hu |
| 2007/0082783 A1 | 4/2007 | Hu et al. |
| 2007/0089403 A1 | 4/2007 | Pfeifer et al. |
| 2009/0035194 A1 | 2/2009 | Robel |
| 2009/0133383 A1 | 5/2009 | Shost |
| 2009/0222191 A1 | 9/2009 | Andrasko |
| 2009/0293459 A1 | 12/2009 | Shimomura et al. |
| 2010/0005783 A1 | 1/2010 | Keppeler et al. |
| 2010/0180579 A1 | 7/2010 | Huang et al. |
| 2010/0180580 A1 | 7/2010 | Boorse et al. |
| 2010/0242438 A1 | 9/2010 | Mital |
| 2010/0242448 A1 | 9/2010 | Mital |
| 2010/0250090 A1 | 9/2010 | Jasinkiewicz et al. |
| 2010/0266471 A1 | 10/2010 | Xu et al. |
| 2010/0319320 A1 | 12/2010 | Mital et al. |
| 2011/0023463 A1 | 2/2011 | Boorse et al. |
| 2011/0047970 A1 | 3/2011 | Yezerets et al. |
| 2011/0138776 A1 | 6/2011 | Huang et al. |
| 2011/0146252 A1 | 6/2011 | Silver et al. |
| 2011/0179777 A1 | 7/2011 | Chandler et al. |
| 2011/0192143 A1 | 8/2011 | Andersson et al. |
| 2011/0265452 A1 | 11/2011 | Geveci et al. |
| 2012/0023905 A1 | 2/2012 | Yezerets et al. |
| 2012/0214663 A1 | 8/2012 | Chigapov et al. |
| 2013/0061576 A1 | 3/2013 | Gonze et al. |
| 2015/0167526 A1 | 6/2015 | Henry et al. |
| 2015/0247437 A1 | 9/2015 | Ancimer et al. |

FOREIGN PATENT DOCUMENTS

| | | |
|---|---|---|
| DE | 19748561 | 5/1999 |
| EP | 2230001 | 9/2010 |
| EP | 2279785 | 2/2011 |
| EP | 1458960 | 9/2011 |
| EP | 2685061 | 1/2014 |
| GB | 1212898 | 11/1970 |
| WO | 2006131825 | 12/2006 |
| WO | 2010094313 | 8/2010 |
| WO | 2011152830 | 12/2011 |
| WO | 2013095214 | 6/2013 |
| WO | 2015086905 | 6/2015 |

SYSTEMS AND METHODS TO REDUCE REDUCTANT CONSUMPTION IN EXHAUST AFTERTREATMENT SYSTEMS

CROSS-REFERENCE TO RELATED APPLICATION

The present application is a divisional of U.S. patent application Ser. No. 14/461,952 filed on Aug. 18, 2014, which claims the benefit of the filing date of U.S. Provisional Application Ser. No. 61/971,262 filed on Mar. 27, 2014, each of which is incorporated herein by reference in its entirety.

GOVERNMENT RIGHTS

The present invention was made with Government assistance from the U.S. Department of Energy (DOE) under contract No. DE-EE0004125. The U.S. Federal Government may have certain rights therein.

BACKGROUND

Control of selective catalytic reduction (SCR) catalysts is of increasing interest to meet modern internal combustion engine emissions standards. The effectiveness of a typical SCR catalyst in removing oxides of nitrogen ($NO_x$) emissions is sensitive to the temperature of the exhaust gas at the inlet to the SCR catalyst. Current catalyst formulations typically operate at optimal efficiency when subjected to exhaust gas temperatures of 200-400° C. and utilize ammonia over the SCR catalyst to reduce NOx. However, engine operating conditions often occur in which the SCR catalyst is operating outside of optimal efficiency temperature conditions.

Reductant consumption in aftertreatment system operations is an operating cost that must be incurred by owners and operators of the engine. When SCR catalysts operate at high temperatures, the parasitic oxidation of ammonia to $N_2$, $N_2O$, or NOx can occur depending on the reaction over the catalyst and the operating conditions. The oxidation conversion amount increases as the exhaust temperature increases, which requires the injection of additional reductant to compensate for the oxidized ammonia and increases operating costs. Improvements in aftertreatment system design and control are required to reduce and optimize reductant consumption. Accordingly, further technological developments in this area are desirable.

SUMMARY

There is disclosed unique methods, apparatus and systems for reducing and/or optimizing reductant consumption in exhaust aftertreatment systems. A multiple component aftertreatment system is disclosed that includes an oxidation catalyst, a particulate filter, a first SCR device downstream of the oxidation catalyst, and a second SCR device downstream of the first SCR device. A first reductant injector is provided upstream of the first SCR device and second reductant injector is provided downstream of the first SCR device. Reductant is provided by the first reductant injector when the first SCR device is in a first temperature range associated with efficient SCR catalyst operation, and reductant is provided by the second reductant injector when the first SCR device temperature exceeds an ammonia oxidation conversion threshold to reduce ammonia oxidation over the first SCR device while maintaining NOx conversion capabilities of the aftertreatment system.

In some embodiments, the aftertreatment system includes passively operated HC and $NO_x$ storage devices upstream of the first SCR device to passively store hydrocarbons and NOx when the first SCR device temperature is below the first temperature range. In certain embodiments, the particulate filter is a close-coupled diesel particulate filter and the first SCR device is a close coupled device. The first SCR device can be separate from the particulate filter, or combined with the particulate filter. As used herein, close-coupled can include being provided as close as practical at a position downstream of a turbine portion of a turbocharger or exhaust manifold, provided within a specified distance downstream of the turbine or exhaust manifold (such as within 12 inches), and/or provided within a specified heat transfer regime or region that is different than the second SCR device that is downstream of the particulate filter and first SCR device.

Embodiments of the systems and methods further include the second SCR device connected to the first SCR device at a separation distance that allows the second SCR device to be operating in a different temperature regime than the first SCR device under certain operating conditions to improve the reductant consumption of the second SCR device over the first SCR device when the first SCR device temperature is above the ammonia oxidation conversion threshold.

The systems and methods reduce reductant consumption while preserving the NOx reduction capabilities of the aftertreatment system by utilizing the first and second SCR devices when they are in efficient operating temperature ranges. The first SCR device can be configured in size for employment as the primary NOx reduction device, while the second SCR device can be sized to meet NOx reduction requirements in high operating temperature conditions where the first SCR device has reduced NOx conversion capabilities and increased ammonia oxidation conversion potential. However, ammonia storage on the first SCR device still provides NOx conversion over the first SCR device while reductant is injected by the second reductant injector. In one embodiment, ammonia storage of the first SCR device is monitored while reductant is supplied by the second reductant injector, and reductant injection is switched to the first reductant injector when an ammonia depletion threshold is reached, even if the first SCR device temperature exceeds the ammonia oxidation conversion threshold.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF THE ILLUSTRATIVE EMBODIMENTS

Figure 1:
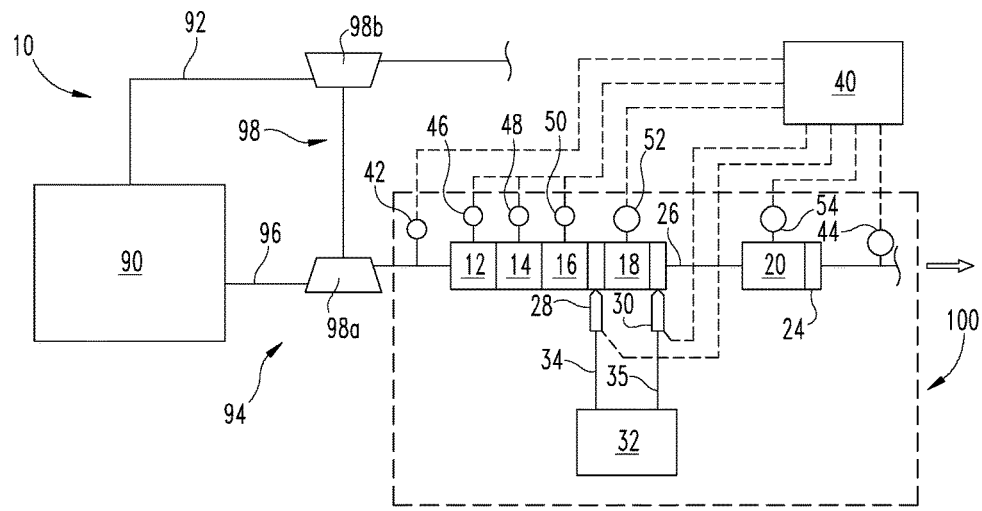
FIG. 1 is schematic of an exemplary internal combustion engine system for $NO_x$ reduction and aftertreatment system control to reduce reductant consumption.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

There is disclosed systems and methods for reduction and optimization of reductant consumption in aftertreatment systems during operation of an internal combustion engine while maintaining NOx conversion efficiency of the aftertreatment system. The aftertreatment system includes an oxidation catalyst, a particulate filter and a first SCR device downstream of the oxidation catalyst. The oxidation catalyst, particulate filter, and first SCR device can be close coupled with a turbine or exhaust manifold to achieve optimal operating temperatures more rapidly. There is further provided a second SCR device downstream of the first SCR device in a lower temperature operating region of the aftertreatment system. A first reductant injector is provided upstream of the first SCR device and a second reductant injector is provided downstream of the first SCR device and upstream of the second SCR device. The first SCR device and first reductant injector are employed as the primary NOx reduction devices during engine operations, and the second SCR device and second reductant injector are employed as a secondary NOx reduction device during operating conditions in which ammonia oxidation conversion over the first SCR device is above a threshold.

The systems and methods may further include low temperature, passive storage of NOx and hydrocarbons to reduce criteria pollutants at least during low exhaust temperature conditions where the first SCR device has limited NOx conversion efficiency. The stored NOx and hydrocarbons are passively released for aftertreatment as the exhaust temperature increases. The systems and methods are configured so that at temperatures where HC and $NO_x$ emissions are released, the oxidation catalyst and first SCR device are effective at mitigating the released HC and $NO_x$ emissions from the storage devices before exiting the tailpipe. The disclosed systems and methods are configured so that the vehicles equipped therewith are operable to meet emissions standards over a wide range of operating conditions while reducing and optimizing reductant consumption without the need for external aftertreatment heating systems, which increase fuel consumption and greenhouse gas emissions from the vehicle, although the use of such external systems is not precluded. In one embodiment, the systems and methods have application for light duty certified chassis vehicles, although applications with other vehicle types are not precluded.

In one embodiment, the aftertreatment system includes a close-coupled HC storage device (HCSD) located directly downstream of a turbine of a turbocharger, with a close-coupled NOx storage device (NSD) located directly downstream of the HCSD. In another embodiment, the NSD is upstream of the HCSD. At low exhaust temperatures, the HCSD readily adsorbs and stores HC. In one specific embodiment, the HCSD includes a catalyst, such as a zeolite-based catalyst, for storing and adsorbing HC, but could be any suitable storage media for a hydrocarbon storage device.

As the exhaust temperature increases, the HCSD releases stored HCs that are stored by the HCSD which are then effectively oxidized by a downstream close-coupled oxidation catalyst, such as a diesel oxidation catalyst (DOC), to form $H_2O$ and $CO_2$. The NSD can be any suitable component, such as a NOx adsorber, capable of passively storing NOx at low exhaust temperature, and then releasing the stored NOx as the exhaust temperature increases. As the temperature of the exhaust gas increases, the NSD releases NOx and the NO portion of the NOx is partially oxidized to form $NO_2$ before being converted to $N_2$ and $H_2O$ by the first SCR device downstream of the DOC. In one embodiment, the HCSD, NSD, and DOC are separate devices. In other embodiments, the HCSD, NSD and DOC are integrated in a single catalyst element that performs all the functions described above. In yet another embodiment, the HCSD and NSD are omitted.

In still another embodiment, the particulate filter and first SCR device are close-coupled elements with the turbine or exhaust manifold, although embodiments without a close-coupled particulate filter and first SCR device are envisioned. In further embodiments, the particulate filter and SCR device are combined as a singled device, or as separate devices.

In a further embodiment, a reductant system is provided for injection of a reductant downstream of the particulate filter and upstream of the first SCR device to facilitate NOx conversion over the first SCR device during a first temperature range, although operation in other temperature operating conditions is not precluded. In one embodiment, the reductant is a gaseous ammonia reductant. In one specific embodiment, the gaseous ammonia reductant is stored with a solid storage media, although other gaseous reductant storage/conversion devices are also contemplated. In another embodiment, the reductant is stored in a liquid medium. The second SCR device is provided downstream of the particulate filter and first SCR device, and a second reductant injection location is provided upstream of the second SCR device and downstream of the first SCR device. The second reductant injection location can utilize gaseous reductant from the gaseous reductant source, or liquid reductant from a second source of liquid reductant, to facilitate $NO_x$ conversion over the second SCR device. In a further embodiment, the downstream SCR device is connected to the first SCR device with an exhaust cooling separation distance to allow the second SCR device to be utilized with reductant injection at the second location during operating conditions where the temperature of the first SCR device is above a first temperature range, such as in response to an ammonia oxidation conversion threshold of the first SCR device or a regeneration event associated with the upstream components. The second SCR device can also be used for NOx conversion during regular, non-high temperature operating conditions when the second SCR device is in an optimal efficiency temperature range. In still other embodiments, reductant is provided at the second injection location in response to the ammonia storage conditions of the first SCR device being above an ammonia depletion threshold and/or the inability of the first SCR device to effectively treat the current level of NOx in the exhaust stream.

Systems and methods for reducing the consumption of reductant in treating emissions of HC and $NO_x$ from lean burn internal combustion engines are also disclosed in FIG. 1. As shown in FIG. 1, an exemplary internal combustion engine system 10 includes an engine 90 having an intake system 92 for receiving fresh air and providing a charge flow to engine 90 and an exhaust system 94 for receiving exhaust gas produced by combustion of the charge flow and fuel in one or more cylinders (not shown) of engine 90. Exhaust system 94 includes at least one exhaust conduit 96 connected to a turbocharger 98 having a turbine 98a in the exhaust conduit and a compressor 98b in the intake system 92. Downstream of turbine 98a exhaust system 94 includes an exhaust aftertreatment system 100, one embodiment of which is shown in FIG. 1.

Aftertreatment system 100 includes a close-coupled HCSD 12 and NSD 14 followed by a close-coupled oxidation catalyst such as a diesel oxidation catalyst (DOC) 16, and close-coupled particulate filter (PF) and first SCR device 18. Aftertreatment system 10 further includes a second or downstream SCR device 20 that can be a standard SCR type NOx reduction catalyst. Elements 12, 14, 16, 18 and 20 are configured to receive exhaust gas produced by an internal combustion engine 90 into exhaust conduit 96. The HCSD 12 and NSD 14 are passively operated storage devices, which require little or no active control strategies, although the use of active control strategies is not precluded. The PF-SCR device 18 is connected to second SCR device 20 by an exhaust cooling distance, such as with an exhaust cooling conduit 26, that allows exhaust to cool before reaching second SCR device 20 in response to, for example, a regeneration event or other high temperature condition of upstream elements 12, 14, 16 and 18, so that second SCR device 20 operates in a different temperature range than PF-SCR device 18 in certain operating conditions.

In other embodiments of FIG. 1, a low pressure exhaust gas recirculation (LPEGR) system (not shown) may be provided to re-circulate exhaust gas to the intake system 92 from the exhaust system 94 at a location downstream of turbine 98a of turbocharger 98. The LPEGR conduit may be taken from one of a number of locations of the exhaust system. For example, the LPEGR conduit may be located downstream of the PF-SCR device 18 and upstream of the second SCR device 20, from a location that is between two portions of the second SCR device 20, or from a location that is downstream of second SCR device 20. The LPEGR may or may not impact the HC and NOx emissions at low temperature operating conditions, and the controller 40 (discussed below) can be configured to take into account LPEGR operations in determining the reductant injection strategy.

At low exhaust gas temperatures which result in low catalyst temperatures, the HCSD 12 in one embodiment is configured to readily adsorb and store HCs until the HCSD 12 reaches a temperature where it can effectively release the HCs to DOC 16, which oxidizes the stored HC to form $CO_2$ and $H_2O$. In addition, the NSD 14 can be configured to readily adsorb and store NOx with its catalyst under low exhaust temperature conditions, and then begins to desorb this NOx as the exhaust temperature and therefore the NSD catalyst temperature increases. The NSD 14 is configured to release the stored NOx at an exhaust temperature where the released NO portion of the $NO_x$ is oxidized and converted to $NO_2$ at DOC 16, and further where NOx is treated at PF-SCR device 18 for reducing NOx to $N_2$ and $H_2O$. Once the aftertreatment system 100 reaches operating temperature, the DOC 16 is responsible for the oxidation of HC, CO and NO in the exhaust gas. PF-SCR device 18 may be combined as a single element as shown by, for example, applying an SCR washcoat to a particulate filter substrate, or split into a separate DPF element and SCR element.

The exhaust aftertreatment system 100 includes DOC 16 that is operable to catalyze oxidation of one or more compounds in the exhaust gas flowing through exhaust conduit 96, for example, oxidation of unburned hydrocarbons or oxidation of NO to $NO_2$. DOC 16 can be any of various flow-through oxidation catalysts. DOC 16 includes a substrate with an active catalyst layer configured to oxidize at least some particulate matter (e.g., the soluble organic fraction of soot) in the exhaust and reduce unburned hydrocarbons and CO in the exhaust to less environmentally harmful compounds. For example, in some implementations, the oxidation catalyst 16 may sufficiently reduce the hydrocarbon and CO concentrations in the exhaust to meet the requisite emissions standards.

The exhaust aftertreatment system 100 may also include a combined PF-first SCR device 18 with a particulate filter configured to reduce the level of particulates in exhaust flowing through exhaust conduit 96. In an exemplary embodiment the particulate filter portion is a catalyzed soot filter. PF-first SCR device 18 can be any of various particulate filters known in the art configured to reduce particulate matter concentrations, e.g., soot and ash, in the exhaust gas to meet requisite emission standards. The PF-first SCR device 18 includes a filter substrate that captures soot and other particulate matter generated by the engine 90. In one embodiment the system 10 is configured to periodically regenerate PF-first SCR device 18 to remove particulate matter that has accumulated on the particulate filter portion over time. For example, PF-first SCR device 18 can be regenerated by increasing the temperature of the exhaust gas above a threshold temperature corresponding with combustion of the particulate matter.

The SCR catalyst washcoat of PF-first SCR device 18 can be configured so that reductant gas or liquid injected into exhaust gas in exhaust conduit 96 is provided thereto and is catalyzed for the reduction of NOx in the exhaust gas. SCR catalyst washcoat and/or SCR catalyst devices can be any of various catalysts known in the art. For example, in some implementations, the SCR catalyst and/or washcoat is a zeolite based catalyst, such as a Cu-Zeolite or a Fe-Zeolite catalyst, or a vanadium based catalyst.

Figure 2:
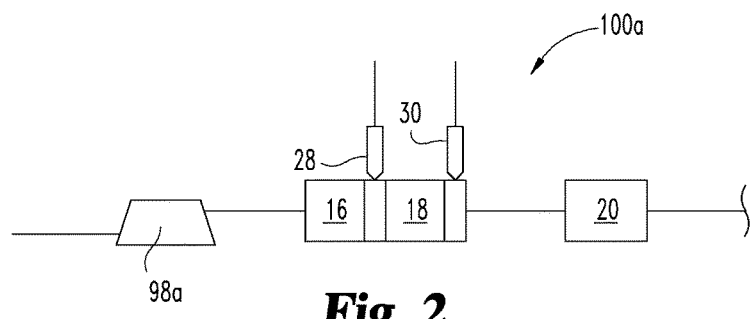
FIG. 2 is a schematic of another embodiment of the system of FIG. 1.
Figure 3:
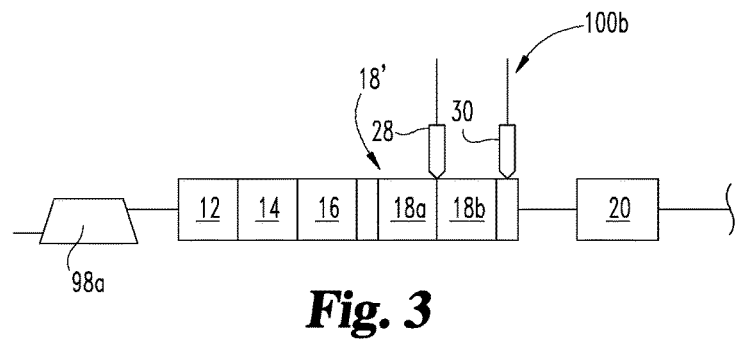
FIG. 3 is a schematic of another embodiment of the system of FIG. 1.
Figure 4:
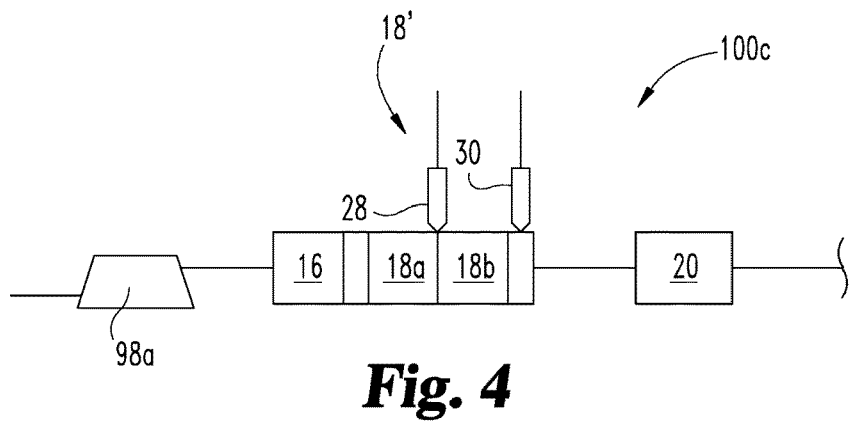
FIG. 4 is a schematic of another embodiment of the system of FIG. 1.
Figure 5:
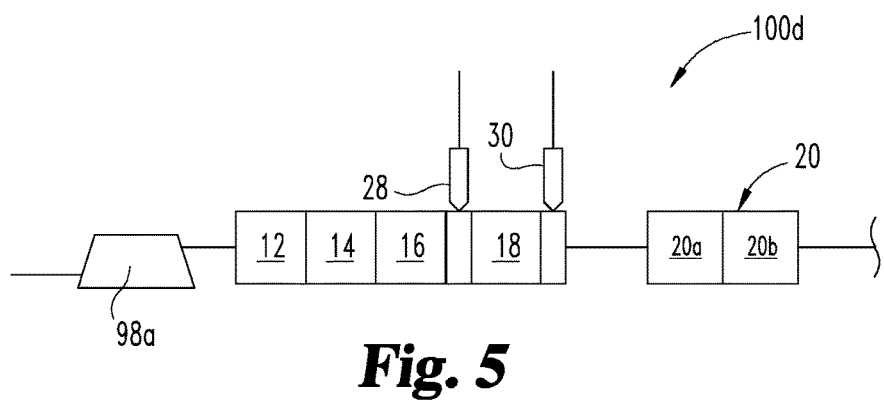
FIG. 5 is a schematic of another embodiment of the system of FIG. 1.

In one alternative embodiment of aftertreatment system 100 shown in FIG. 2, aftertreatment system 100a does not include passive storage devices such as HCSD 12 and/or NSD 14. Rather, DOC 16 is close-coupled downstream of turbine 98a without intervening passive storage devices. In another embodiment shown in FIG. 3, aftertreatment system 100b includes a separate PF and first SCR device 18' with a PF device 18a upstream of a separate first SCR device 18b. The separate devices 18' can be provided with upstream passive storage devices HCSD 12 and NSD 14 as shown, or without passive storage devices, such as shown with aftertreatment system 100c in FIG. 4. In still another embodiment shown in FIG. 5, aftertreatment system 100d includes a second SCR device 20 having separate catalyst elements, including an upstream SCR catalyst element 20a and a downstream SCR catalyst element 20b. In a specific embodiment, the catalyst elements 20a, 20b are separate bricks. In other embodiments, second SCR device 20 consists of a single catalyst brick. As used herein, aftertreatment system 100 refers collectively to aftertreatment systems 100, 100a, 100b, 100c, and 100d unless specified to the contrary.

Aftertreatment system 10 further includes a first reductant injector 28 upstream of PF-first SCR device 18 and a second reductant injection 30 downstream of PF-first SCR device 18 and upstream of second SCR device 20. In one embodiment, first reductant injector 28 is connected between DOC 16 and PF-first SCR device 18. Reductant injectors 28, 30 are connected to at least one reductant source 32. In some embodiments, reductant source 32 is a source of liquid reductant such as urea. In other embodiments, reductant source 32 stores an amount of a dry NOx reductant such as, for example, ammonia ($NH_3$), in a solid storage media, although any suitable storage for a gaseous reductant is contemplated. In one embodiment, the solid storage media may be any material involving adsorption or absorption of molecular ammonia in the solid, or a solid chemical compound which can be manipulated in order to produce gaseous ammonia. In one particular embodiment, the solid storage media includes metal ammine salts. The NOx reductant stored in the solid storage media housed in reductant source 32 may be ammonia or any other reductant understood in the art capable of being stored and selectively released from a solid storage media. Reductant source 32 may include a cartridge or housing providing one or more storage units having one or more compartments for storing ammonia in solid storage media.

Reductant source 32 is connected to one or both of reductant injectors 28, 30 with a reductant delivery system 34, 35, respectively, that is configured to provide gaseous reductant released from reductant source 32, and provides the gaseous reductant to the exhaust flowpath through the respective reductant injector 28, 30. Gaseous reductant passes through a reductant supply line from reductant source 32 to a metering device (not shown) and from metering device to injector 28, 30 for mixing with the exhaust gas in the exhaust flowpath. The respective delivery systems 34, 35 may include sensors, control valves, heating sources, coolant lines, and other devices useful in the release of gaseous reductant from the solid storage media and in the delivery of the gaseous reductant to the exhaust flowpath in the desired amount, rate and timing.

In one embodiment, reductant source 32 is operatively coupled with at least one engine coolant feed line and an engine coolant return line (not shown) that provide a source of heat that heats the solid storage media stored in reductant source 32 to release the stored reductant in gaseous form. Other embodiments contemplate other means for heating the solid storage media in reductant source 32, including, for example, an electrical heating element coupled to a power source such as a battery or generator. The heat source can be embedded in the solid storage media, or can extend around the outside of the solid storage media, or a combination of these arrangements. In one embodiment, heating of the solid storage material releases gaseous $NH_3$ from the solid storage media into the respective supply line by thermal desorption. The consumption rate of the released $NH_3$ gas is measured by the respective metering device as it is mixed into exhaust flowpath. Pressure/temperature control of reductant source 32 can be provided to control of the release of the reductant gas.

In an alternative embodiment, system 10 also or alternatively includes a liquid reductant source 32 that stores an amount of liquid NOx reductant such as, for example, $NH_3$, in a liquid storage medium. In one embodiment, the liquid storage medium is diesel exhaust fluid stored in a tank. Other liquid reductant storage mediums such as urea are also contemplated. The liquid reductant source is connected to first reductant injector 28 and/or second reductant injector 30. Alternatively, both a gaseous and a liquid reductant source are connected to and selectively operable to provide reductant to both reductant injectors 28, 30 in response to certain operating conditions.

System 10 includes a controller 40 and other aftertreatment components in addition to those shown in FIG. 1. For example, system 10 may include an ammonia oxidation catalyst (AMOX) 24 downstream of the second SCR device 20. In certain embodiments, the AMOX 24 may not be present, or the AMOX may be commingled with the second SCR device 20 (or the last SCR catalyst, where multiple SCR catalysts are present), for example with a washcoat applied toward the rear portion of the SCR device 20 that is responsive to at least partially oxidize ammonia. In other embodiments, any of these components may be present or missing, catalyzed or not catalyzed, and may be arranged in alternate order. Further, certain components or all components may be provided in the same or separate housings.

Controller 40 can include a number of modules structured to functionally execute operations for controlling the SCR system. In certain embodiments, the controller forms a portion of a processing subsystem including one or more computing devices having memory, processing, and communication hardware. The controller 40 may be a single device or a distributed device, and the functions of the controller may be performed by hardware or by hardware configured by software. The controller 40 may be in communication with any sensor, actuator, datalink, and/or network in the system.

The exemplary system 10 further includes various sensors. The illustrated sensors in FIG. 1 include a first NOx sensor 42 positioned upstream of the HCSD 12 and a second NOx sensor 44 positioned downstream of the second SCR device 20. Alternatively or additionally, NOx sensors (not shown) can be provided at the outlet of NSD 14, at the outlet of PF-first SCR device 18, and/or between the inlet to second SCR device 20 and the outlet of PF-first SCR device 18. System 10 also includes a first temperature sensor 46 at, for example, the inlet of HCSD 12, a second temperature sensor 48 between HCSD 12 and NSD 14, a third temperature sensor 50 at the outlet of NSD 14, and a fourth temperature sensor 52 at PF-first SCR device 18, and a fifth temperature sensor 54 at second SCR device 20. Other embodiments contemplated NOx, temperature, and/or $NH_3$ sensors at the outlet of DOC 16 and/or the inlet to PF-first SCR device 18. Other sensors can be provided to measure or determine the mass flow through the exhaust system, the temperature of any component of the aftertreatment system, the amount of ammonia stored in one or both of SCR devices 18, 20 or outlet therefrom, etc.

The illustrated sensors are exemplary only, and may be re-positioned, removed, substituted, and other sensors may be present that are not illustrated in FIG. 1. Further, certain sensors may instead be virtual sensors that are calculated from other parameters available to the system 10, or values that would be indicated by sensors may instead be supplied to a computer readable memory location, via a datalink or network communication, or otherwise be made available to the system 10 where the sensor providing the sensed parameter is not a part of the defined system 10.

Figure 6:
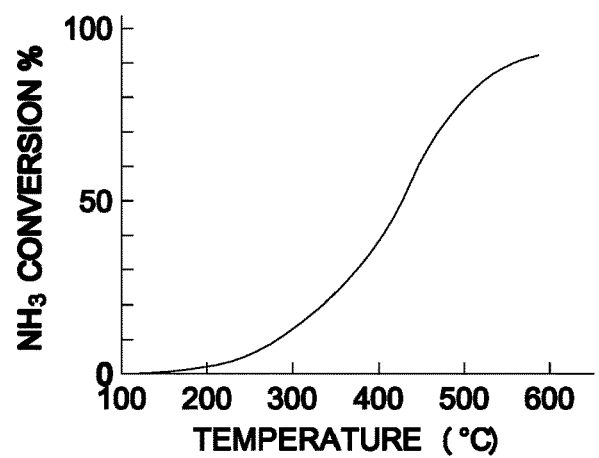
FIG. 6 is a graphical illustration of ammonia oxidation conversion by an SCR catalyst as a function of temperature.

Controller 40 is configured to receive inputs of temperature conditions associated with PF-first SCR device 18 and second SCR device 20 and control reductant injection from first reductant injector 28 and second reductant injector 30 to minimize reductant consumption over PF-first SCR device 18 while maintaining the NOx conversion capability of aftertreatment system 100. As shown in FIG. 6, the percentage of ammonia that is converted in parasitic oxidation over PF-first SCR device 18 increases as the temperature of the PF-first SCR device 18 increases. Therefore, when the temperature of the PF-first SCR device 18 exceeds an ammonia oxidation conversion threshold, reductant is injected from second reductant injector 30 to reduce reductant consumption over the first SCR device 18. The selection of the ammonia oxidation conversion threshold temperature can be based on, for example, the formulation of first SCR device 18, the size and NOx conversion capabilities of first and second SCR devices 18, 20, the desired or acceptable level of ammonia oxidation conversion, and/or the operating parameters.

Figure 7:
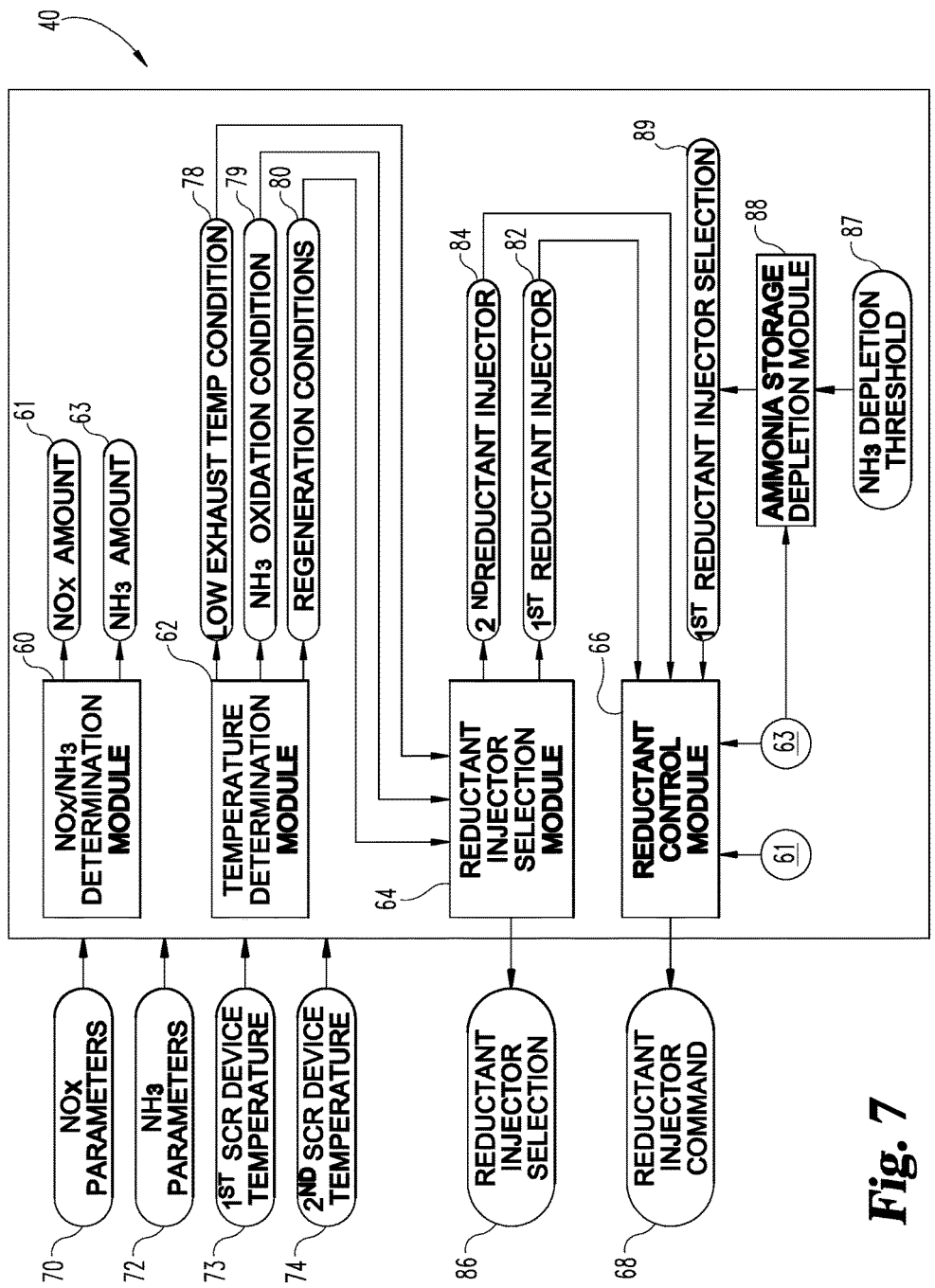
FIG. 7 is a schematic of a controller structured to control the systems disclosed herein to reduce reductant consumption.

In certain embodiments, such as shown in FIG. 7, the controller 40 includes a NOx/NH$_3$ determination module 60, a temperature determination module 62, a reductant injector selection module 64, and a reductant control module 66. In certain embodiments, controller 40 includes an ammonia storage depletion module 88. The description herein including modules emphasizes the structural independence of the aspects of the controller 40, and illustrates one grouping of operations and responsibilities of the controller 40. Other groupings that execute similar overall operations are understood within the scope of the present application.

The exemplary controller 40 is configured for executing operations to provide a reductant injector command 68 for the effective removal of NOx from the exhaust gas with one or both of PF-first SCR device 18 and second SCR device 20 while reducing and/or optimizing the consumption of reductant. The operations of the controller 40 include operations that adjust nominal control operations for a NOx aftertreatment system utilizing a reductant. Nominal control operations for a NOx aftertreatment system, including an SCR aftertreatment system, are understood in the art and are not described further herein. Any nominal NOx aftertreatment control operations may be utilized by system 10 disclosed herein.

The controller 40 includes NOx/NH$_3$ determination module 60 that receives NOx parameters 70 from NOx sensors such as sensors 42, 44 and determines an amount of NOx emitted from engine 22 and from one or both of PF-first SCR device 18 and second SCR device 20. Controller 40 can also be configured to receive inputs from sensors, determine or calculate an amount of NOx 61 at the outlet of PF-first SCR device 18 or at any other location in system 10. NOx/NH$_3$ determination module 60 can also receive NH$_3$ parameters 72 from NH$_3$ sensors or by calculation from other operating parameters and determine an amount of NH$_3$ 63 that is stored, an NH$_3$ storage capacity, and/or NH$_3$ slip from one or both of PF-first SCR device 18 and second SCR device 20.

Controller 40 also includes a temperature determination module 62 that receives a first SCR device temperature 73 and a second SCR device temperature 74 from, for example, one or more of temperature sensors 46, 48, 50, 52, 54 to determine a temperature of the first and second SCR devices 18, 20, the temperature of exhaust gas in the flowpath and/or of the various catalysts and aftertreatment components. In one embodiment, temperature determination module 62 is configured to determine a low exhaust temperature operating condition 78, an ammonia oxidation conversion operating condition 79, and an exhaust aftertreatment component regeneration condition 80 in response to the temperature sensor inputs. Low exhaust temperature operating condition 78 can correspond to, for example, an operating temperature that is below a desired effective operating temperature or temperature range of PF-first SCR device 18 and/or second SCR device 20. Ammonia oxidation conversion operating condition 79 can correspond to a temperature condition of PF-first SCR device 18 that is above an ammonia oxidation conversion threshold. Regeneration condition 80 can correspond to a temperature of PF-first SCR device 18 that is above a regeneration temperature threshold. Other temperature conditions or operating modes could also be determined, such as PC-first SCR device 18 and/or second SCR device 20 being in a first temperature range that corresponds to an optimal efficiency temperature range.

Controller 40 also includes reductant injector selection module 64 configured to select one or both of reductant injectors 28, 30 from which to provide reductant in response to the operating conditions of aftertreatment system 100, such as the temperature conditions 78, 79, 80 determined by temperature determination module 62. Reductant injector selection module 64 can be configured, for example, to output a reductant injection selection 86 to enable operation of reductant injector 28 with first reductant injector selection 82, or enable operation of reductant injector 30 with second reductant injector selection 84. In one embodiment, only one of reductant injectors 28, 30 is enabled for operation at the same time in response to certain operating conditions. In other embodiments, reductant injection from both reductant injectors 28, 30 is enabled.

Controller 40 further includes a reductant control module 66 that determines an appropriate reductant injector command 68 for the amount of reductant to be injected into the exhaust gas to provide a desired emissions level for NOx at the outlet of one or both of first SCR device 18 and second SCR device 20. The reductant injector command 68 can be based on, for example, NOx amount 61, NH$_3$ amount 63, the temperature conditions, exhaust flow conditions, and/or other control parameters for NOx reduction.

During low temperature operating conditions for engine 90 and for exhaust gas and/or aftertreatment components in aftertreatment system 100, first and second SCR devices 18, 20 can be inefficient in treating NO$_x$ to meet desired emissions level targets. Furthermore, traditional oxidation catalysts upstream of PF-first SCR device 18 are ineffective in removing HC to meet criteria emissions levels at low temperature operating conditions. Therefore, in embodiments employing passive storage devices, HCSD 12 is configured to store HC and NSD 14 is configured to store NOx during low exhaust temperature operating conditions until PF-first SCR device 18 is at a temperature effective to remove the criteria pollutants from the emissions of engine 90.

During low temperature operating conditions 78 reductant injector selection module 64 can disable reductant injectors 28, 30 when, in embodiments employing such storage devices, NOx and hydrocarbons are being stored. When the temperature of the PF-first SCR device 18 reaches an effective operating temperature, first reductant injector 28 can be enabled to provide reductant injection for NOx conversion over first SCR device 18, even if second SCR device 20 is below its effective operating temperature.

During nominal operations, primary NOx conversion by aftertreatment system 100 is provided by PF-first SCR device 18 while PF-first SCR device 18 is in an optimal operating temperature range. However, in response to NH$_3$ oxidation conversion condition 79, and/or in response to regeneration condition 80, reductant injector selection module 64 enables second reductant injector 30 for injection of reductant to provide NOx conversion over second SCR device 20 and reduce reductant consumption over PF-first SCR device 18 by avoiding or reducing reductant injection during ammonia oxidation conversion conditions. In certain embodiments, second reductant injector 30 is not enabled until a temperature of second SCR device 20 is above a low temperature threshold associated with efficient NOx conversion over second SCR device 20.

PF-first SCR device 18 also contributes to NOx reduction while reductant is provided by second reductant injector 30 by conversion of NOx with stored ammonia on PF-first SCR device 18. In one embodiment, controller 40 includes an ammonia storage depletion module 88 that receives $NH_3$ amount 63 and an ammonia depletion threshold 87 of PF-first SCR device 18. In response to the $NH_3$ amount 63 being less than ammonia depletion threshold 87, a first reductant injector selection 89 is provided that enables first reductant injector 28 to inject a reductant amount to increase ammonia storage on PF-first SCR device 18 even if a temperature of PF-first SCR device is above the ammonia oxidation conversion threshold.

During other operating conditions, reductant injection can be provided by first reductant injector 28 in response to $NH_3$ storage conditions on PF-first SCR device 18, either with second injector 30 disabled or enabled. In yet another embodiment, in response to detection of a regeneration condition 80, reductant injector selection module 64 selects second reductant injector 30 to provide all or a portion of the reductant to a cooler second SCR device 20 that is separated from the PF-first SCR device 18 by exhaust cooling conduit 26. At high regeneration temperatures, such as those in excess of 550 degrees Celsius, the PF-first SCR device 18 can be less effective in converting NOx, so the NOx conversion occurs in the downstream second SCR device 20. In still other embodiments relating to low temperature and/or high temperature operating conditions, reductant can be provided simultaneously through reductant injectors 28, 30 in a proportion and amount determined by controller 40 and operations of one or both of PF-SCR device 18 and second SCR device 20 can be provided to convert $NO_x$ in the exhaust gas to the desired levels.

Figure 8:
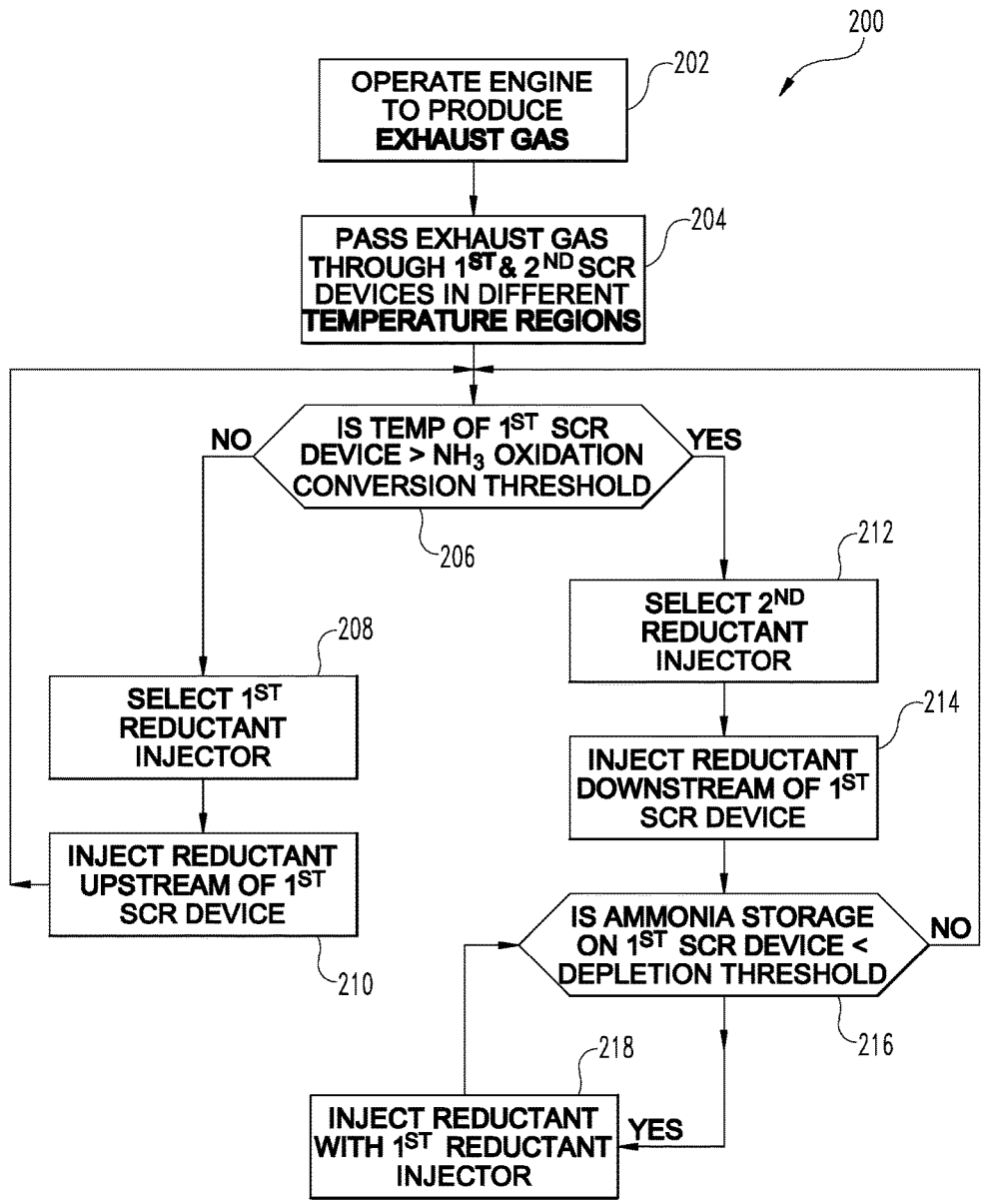
FIG. 8 is a flow diagram of one embodiment of a procedure to reduce reductant consumption.

Referring now to FIG. 8, one embodiment of a procedure 200 to reduce reductant consumption in aftertreatment system 100 is described. Procedure 200 includes an operation 202 to operate engine 90 to produce an exhaust flow containing a NOx amount. Procedure 200 continues at operation 204 to pass the exhaust flow through first PF-SCR device 18 and second SCR device 20 downstream of the first PF-SCR device 18 and the first and second SCR devices are located in separate operating temperature regions of the aftertreatment system.

Procedure 200 continues at conditional 206 to determine if the temperature of the first PF-SCR device 18 is greater than an ammonia oxidation conversion threshold. If conditional 206 is negative, procedure 200 continues at operation 208 to select first reductant injector 28 and at operation 210 to inject a reductant amount upstream of first PF-SCR device 18 to provide NOx reduction in response to the NOx amount in the exhaust gas. In a further embodiment, the temperature of first PF-SCR device 18 can be determined to be above a low temperature threshold and/or in a first temperature range associated with efficient NOx conversion to enable reductant injection with the first reductant injector 28.

If conditional 206 is positive, procedure 200 continues at operation 212 to select second reductant injector 30 and at operation 214 to inject a reductant amount with second reductant injector 30 to provide NOx conversion over second SCR device 20 in response to the NOx amount in the exhaust gas. Since second SCR device 20 is in a lower temperature operating region than first PF-SCR device 18, reductant consumption due to oxidation conversion is reduced. Ammonia storage on first PF-SCR device 18 contributes to NOx reduction over first PF-SCR device 18 while second SCR device 20 is provided reductant for NOx conversion. In one embodiment, procedure 200 determines that second SCR device 20 is above a low temperature threshold before enabling operation of second reductant injector 30.

In one embodiment, procedure 200 includes conditional 216 to determine if an ammonia storage amount on first PF-SCR device 18 is less than an ammonia depletion threshold. If conditional 216 is negative, procedure 200 returns to conditional 206. If conditional 206 is positive, procedure 200 continues at operation 218 to inject reductant with first reductant injector 28 to increase the ammonia storage on first PF-SCR device 18, and returns to operation 216. In one embodiment, procedure 200 includes disabling injection of reductant downstream of the first PF-SCR device 18 while injecting the first reductant amount, and disabling injection of reductant upstream of the first PF-SCR device 18 while injecting the second reductant amount. In another embodiment, procedure 200 includes storing hydrocarbons and NOx upstream of the first PF-SCR device 18 while the first temperature of the first PF-SCR device 18 is below a low temperature threshold.

As is evident from the figures and text presented above, a variety of embodiments according to the present invention are contemplated.

An exemplary set of embodiments includes a system with an internal combustion engine operable to produce an exhaust gas and an exhaust conduit fluidly coupled to the internal combustion engine to receive the exhaust gas. The system includes an oxidation catalyst connected to the exhaust conduit to receive the exhaust gas, a particulate filter and a first SCR device fluidly coupled to the exhaust conduit downstream of the oxidation catalyst, and a second SCR device fluidly coupled to the exhaust conduit downstream of the particulate filter and the first SCR device where the second SCR device is located in a lower temperature operating region than the first SCR device. The system also includes a first reductant injector upstream of the first SCR device operable to provide a reductant into the exhaust gas during a first temperature range of operation of the first SCR device to reduce NOx primarily over the first SCR device. The first reductant injector is disabled in response to a temperature of the first SCR device being above a reductant oxidation conversion threshold. A second reductant injector is downstream of the first SCR device and upstream of the second SCR device operable to provide the reductant into the exhaust gas to reduce NOx over the second SCR device when the temperature of the first SCR device is above the first temperature range and the second SCR device is above a minimum temperature threshold.

In one embodiment, the system includes at least one storage device fluidly coupled to the exhaust conduit upstream of the oxidation catalyst. The at least one storage device is configured to provide a storage location for hydrocarbons and oxides of nitrogen in the exhaust gas produced by the internal combustion engine during low temperature operating conditions. In a refinement of this embodiment, the at least one storage device includes a separate device for each of hydrocarbon storage and oxides of nitrogen storage.

In another embodiment, the first SCR device and the second SCR device are connected by an exhaust conduit portion configured to provide exhaust cooling from the first SCR device to the second SCR device. In yet another embodiment, a source of liquid reductant is coupled to at least one of the first and second reductant injectors. In a further embodiment, the system includes a source of gaseous reductant coupled at least to the first reductant injector. In a refinement of this embodiment, the source of gaseous reductant is coupled to each of the first and second reductant injectors. In another embodiment, the first temperature range includes a low temperature threshold associated with a NOx conversion efficiency of the first SCR device and a high temperature threshold associated with the reductant oxidation conversion threshold of the first SCR device.

In another embodiment, the first SCR device is included as a washcoat on the particulate filter. In yet another embodiment, the particulate filter is upstream of the first SCR device. In a further embodiment, the first reductant injector is between the first SCR device and the particulate filter. In yet another embodiment, the second SCR device includes a first SCR element upstream of a second SCR element.

In another embodiment, the system includes a controller. The controller includes a $NO_x$ determination module structured to determine a $NO_x$ amount upstream of the first SCR device; a temperature determination module structured to determine the temperature of the first SCR device and a temperature of the second SCR device; an injector selection module structured to select at least one of the first reductant injector and the second reductant injector in response to the temperature of the first SCR device and the temperature of the second SCR device; and a reductant control module structured to determine a reductant injector command to the selected ones of the first reductant injector and the second reductant injector in response to the $NO_x$ amount to achieve a desired $NO_x$ conversion by the first SCR device and the second SCR device. In a refinement of this embodiment, the controller further includes an ammonia storage depletion module structured to determine an ammonia storage amount on the first SCR device. The ammonia storage depletion module is structured to enable the first reductant injector to inject a reductant amount when the ammonia storage amount on the first SCR device is less than an ammonia depletion threshold.

According to another aspect, a method for reducing reductant ammonia consumption in an aftertreatment system is disclosed. The method includes operating an internal combustion engine to produce an exhaust flow containing a NOx amount; passing the exhaust flow through a first SCR device and a second SCR device downstream of the first SCR device where the first SCR device and the second SCR device are located in separate operating temperature regions of the aftertreatment system; determining a first temperature of the first SCR device and a second temperature of the second SCR device; injecting a first reductant amount upstream of the first SCR device in response to the first temperature being below an ammonia oxidation conversion threshold; and injecting a second reductant amount downstream of the first SCR device in response to the first temperature being above the ammonia oxidation conversion threshold. In one embodiments, the first and second reductant amounts are determined at least in part based on the NOx amount in the exhaust flow.

In one embodiment, the method includes disabling injection of reductant downstream of the first SCR device while injecting the first reductant amount and disabling injection of reductant upstream of the first SCR device while injecting the second reductant amount. In another embodiment, the method includes connecting the first SCR device to the second SCR device with an exhaust cooling conduit. In yet another embodiment, the method includes storing hydrocarbons and NOx upstream of the first SCR device while the first temperature of the first SCR device is below a low temperature threshold.

In yet another embodiment, the first SCR device is combined with a particulate filter. In a further embodiment, a particulate filter is provided upstream of the first SCR device and injecting the first reductant amount includes injecting the first reductant amount downstream of the particulate filter and upstream of the first SCR device. In another embodiment, an oxidation catalyst is provided upstream of the first SCR device and injecting the first reductant amount includes injecting the first reductant amount between the oxidation catalyst and the first SCR device.

In a further embodiment, the first reductant amount and the second reductant amount are amounts of ammonia gas. In another embodiment, the first reductant amount and the second reductant amount are amounts of urea. In yet another embodiment, the method includes storing hydrocarbons and NOx upstream of the first SCR device when the exhaust gas is in a low temperature range.

According to another aspect, an apparatus for reducing reductant consumption in an exhaust aftertreatment system is disclosed. The apparatus includes an exhaust system including a first SCR device and a second SCR device downstream of the first SCR device, at least one passive storage device upstream of the first SCR device, a first reductant injector upstream of the first SCR device, and a second reductant injector downstream of the first SCR device and upstream of the second SCR device. A plurality of sensors are operable to provide signals indicative of a first temperature of the first SCR device, a second temperature of the second SCR device, and a NOx amount in an exhaust gas upstream of the first SCR device. The apparatus includes a controller structured to control the first reductant injector to inject a first reductant amount in response to the first SCR device operating in a first temperature range and a NOx amount in an exhaust gas, and to control the second reductant injector to inject a second reductant amount in response to the NOx amount and the first temperature of the first SCR device exceeding an ammonia oxidation conversion threshold.

In one embodiment, the apparatus includes an oxidation catalyst upstream of the first SCR device. In another embodiment, the apparatus includes a particulate filter upstream of the first SCR device. In a refinement of this embodiment, the first SCR device is provided as a washcoat on the particulate filter.

In another embodiment, the controller is structured to determine an ammonia storage amount on the first SCR device and control the first reductant injector to inject a third reductant amount in response to the ammonia storage amount being less than an ammonia depletion threshold when the first temperature exceeds the ammonia oxidation conversion threshold. In yet another embodiment, the second reductant injector is disabled while the first reductant injector injects the first reductant amount and the first reductant injector is disabled while the second reductant injector injects the second reductant amount.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine operable to produce an exhaust gas;
an exhaust conduit fluidly coupled to the internal combustion engine to receive the exhaust gas;
an oxidation catalyst connected to the exhaust conduit to receive the exhaust gas;
a particulate filter and a first selective catalytic reduction (SCR) device fluidly coupled to the exhaust conduit downstream of the oxidation catalyst;
a second SCR device fluidly coupled to the exhaust conduit downstream of the particulate filter and the first SCR device, wherein the second SCR device is located in a lower temperature operating region than the first SCR device;
a controller operably connected to a first reductant injector and a second reductant injector;
wherein the first reductant injector is upstream of the first SCR device and is controlled by the controller to inject a reductant into the exhaust gas during a first temperature range of operation of the first SCR device to reduce NOx primarily over the first SCR device, and the first reductant injector is disabled by the controller in response to a temperature of the first SCR device being above a reductant oxidation conversion threshold; and
wherein the second reductant injector is downstream of the first SCR device and upstream of the second SCR device and is controlled by the controller to inject the reductant into the exhaust gas to reduce NOx over the second SCR device in response to the temperature of the first SCR device being above the first temperature range and the second SCR device being above a minimum temperature threshold.

2. The system of claim 1, further comprising at least one storage device fluidly coupled to the exhaust conduit upstream of the oxidation catalyst, wherein the at least one storage device is configured to provide a storage location for hydrocarbons and oxides of nitrogen in the exhaust gas produced by the internal combustion engine during low temperature operating conditions.

3. The system of claim 2, wherein the at least one storage device includes a separate device for each of hydrocarbon storage and oxides of nitrogen storage.

4. The system of claim 1, further comprising the first SCR device and the second SCR device being connected by an exhaust conduit portion configured to provide exhaust cooling from the first SCR device to the second SCR device.

5. The system of claim 1, further comprising, a source of liquid reductant coupled to at least one of the first and second reductant injectors.

6. The system of claim 1, further comprising a source of gaseous reductant coupled at least to the first reductant injector.

7. The system of claim 6, wherein the source of gaseous reductant is coupled to each of the first and second reductant injectors.

8. The system of claim 1, wherein the first SCR device is included as a washcoat on the particulate filter.

9. The system of claim 1, wherein the particulate filter is upstream of the first SCR device.

10. The system of claim 1, wherein the first reductant injector is between the the particulate filter and the first SCR device.

11. The system of claim 1, wherein the second SCR device includes a first SCR element upstream of a second SCR element.

12. The system of claim 1, wherein the controller comprises:
a $NO_x$ determination module structured to determine a $NO_x$ amount upstream of the first SCR device;
a temperature determination module structured to determine a temperature of the first SCR device and a temperature of the second SCR device;
an injector selection module structured to select at least one of the first reductant injector and. the second reductant injector in response to the temperature of the first SCR device and the temperature of the second SCR device; and
a reductant control module structured to determine a reductant injector command to the selected ones of the first reductant injector and the second reductant injector in response to the $NO_x$ amount to achieve a desired $NO_x$ conversion by the first SCR device and the second SCR device.

13. The system of claim 12, wherein the controller further comprises an ammonia storage depletion module structured to determine an ammonia storage amount on the first SCR device, the ammonia storage depletion module further being structured to enable the first reductant injector to inject a reductant amount when the ammonia storage amount on the first SCR device is less than an ammonia depletion threshold.

14. The system of claim 1, wherein the first temperature range includes a low temperature threshold associated with a NOx conversion efficiency of the first SCR device and a high temperature threshold associated with the reductant oxidation conversion threshold of the first SCR device.

15. A system, comprising:
an exhaust conduit for receiving an exhaust gas from an internal combustion engine;
a first selective catalytic reduction (SCR) device fluidly coupled to the exhaust conduit to receive the exhaust gas;
a second SCR device fluidly coupled to the exhaust conduit downstream, of the first SCR device, wherein the second SCR device is located in a lower temperature operating region than the first SCR device;
a controller operably connected to a first reductant injector and a second reductant injector;
wherein the first reductant injector is upstream of the first SCR device and in response to the controller injects a reductant into the exhaust gas during a first temperature range of operation of the first SCR device to reduce NOx primarily over the first SCR device, wherein the first reductant injector is disabled by the controller in response to a temperature of the first SCR device being above a reductant oxidation conversion threshold; and
wherein the second reductant injector is downstream of the first SCR device and upstream of the second SCR device and in response to the controller injects the reductant into the exhaust gas to reduce NOx over the second SCR device in response to the temperature of the first SCR device being above the first temperature range and the second SCR device being above a minimum temperature threshold.

16. The system of claim 15, further comprising:

an oxidation catalyst connected to the exhaust conduit to receive the exhaust gas; and a particulate filter fluidly coupled to the exhaust conduit downstream of the oxidation catalyst.

17. The system of claim 16, further comprising at least one storage device fluidly coupled to the exhaust conduit upstream of the oxidation catalyst, wherein the at least one storage device is configured to provide a storage location for hydrocarbons and oxides of nitrogen in the exhaust gas during low temperature operating conditions.

18. The system of claim 17, wherein the at least one storage device includes a single device for hydrocarbon storage and oxides of nitrogen storage.

* * * * *